H. THAYER.
MACHINE FOR MAKING BOXES.
No. 43,239
PATENTED JUNE 21, 1864.
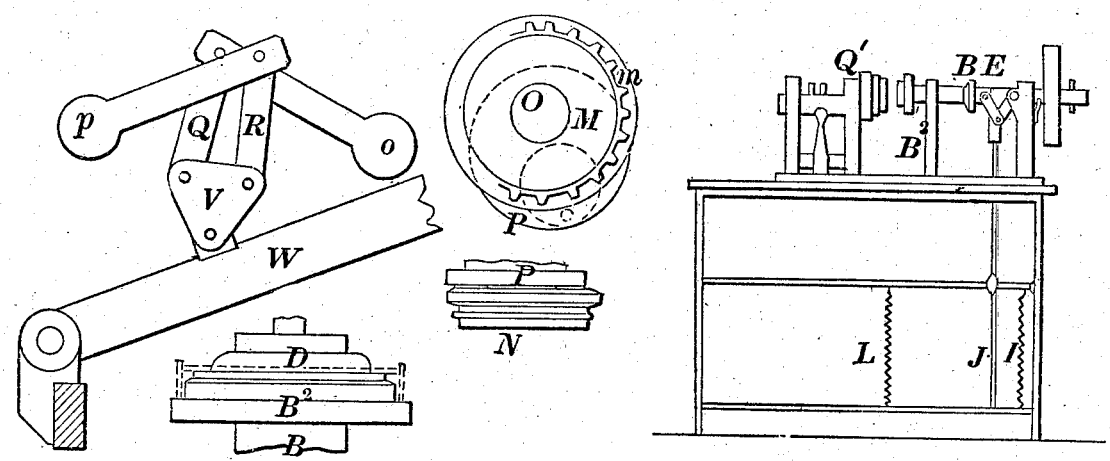
TAKEN FROM PATENT OFFICE REPORT
1864 VOL. II.
ONLY DRAWING ACCESSIBLE (1911)

UNITED STATES PATENT OFFICE.

HORACE THAYER, OF BROOKLYN, NEW YORK.

IMPROVEMENT IN MACHINES FOR MAKING BOXES.

Specification forming part of Letters Patent No. 43,239, dated June 21, 1864.

*To all whom it may concern:*

Be it known that I, HORACE THAYER, of Brooklyn, in the county of Kings and State of New York, have invented a certain new and useful Process for Making Boxes and Cases; and I do hereby declare that the following is a full and exact description thereof, reference being had to the accompanying drawings, in which—

Figure 1 is a side elevation of the entire machine with the treadle in its most elevated position. Fig. 2, on the left, is a view of the corresponding end. Fig. 3, on the right, is a view of the corresponding end. Fig. 4 is a side elevation of the entire machine with the treadle depressed to its lowest position. Fig. 5, on the left, is a view of the corresponding end. Fig. 6, on the right, is a view of the corresponding end. Fig. 7 is a sectional view, and exhibits on a scale, full size, the relations of certain parts when the machine is in condition for receiving or discharging the material. Fig. 8 is a corresponding plan view, exhibiting in red outline the condition in which the material for a box is held in place and rotated in order to be properly shaped by the action of the mechanism. Fig. 9 is a cross-section showing the box or case in the condition in which it is discharged. Fig. 10 is a sectional view showing the device by which the shaping mechanism is controlled. The dark lines indicate the parts in an open condition corresponding to Figs. 7 and 8. The red outlines indicate the positions when the shaping-wheels are brought into contact with the material and commence to give shape to the box or case. Fig. 11 is a sectional view representing the clutch and the central portion of the pulley to which the power is applied by a belt in an obvious manner. Fig. 12 is a perspective view (photographic) of an entire machine involving the same invention, but having different means of operating some of the parts. Fig. 13 is a side view of a blacking-box complete made with a series of indentations in the manner which I prefer, and with its cover correspondingly made and properly applied. Fig. 14 is a cross-section of the same. Fig. 15 is a top view, half in plan and half in section. The lower half is a section on the line S S in Fig. 14.

Similar letters and numbers for reference indicate like parts in all the figures.

My machine is capable of producing boxes and cases of cheap material, highly elastic, very strong, and adapted to a great variety of common uses, especially the manufacture of blacking-boxes, and to accomplish this more rapidly and cheaply than any before known to me. I can make by its aid boxes and cases in forms which are circular or oval, or square with rounded corners, but each form requires a different form of some of the parts.

The machine is employed to give the final shape and unity to the box or case by properly compressing and joining the parts.

In making boxes with covers I produce the body at one operation and the cover at another, adjusting the machine so as to adapt it properly to the article to be made. The bottoms or ends may be of wood, pasteboard, or other hard and stiff substance, but the sides should be of a material capable of being bent and worked in various forms, and of maintaining the condition in which it is left. I prefer common tinned iron for the latter purpose.

In making circular boxes (the form easiest made) I form the tin around and join the edges, by soldering or otherwise, and thus produce a plain band or thin ring of such size as will snugly receive the circular bottom or end piece.

Before putting the material into the machine I introduce the bottom into the ring, and thus make an approximation to the proper form of the box or case; but the parts are at this juncture very weakly connected. By the operation of my machine I join them permanently and very strongly.

My machine may operate so rapidly that the material may be introduced and the boxes or cases removed at the rate of thirty per minute, it being premised that the material is first properly applied together by an assistant. The ends of the boxes or cases are secured in their places by folding the metal down over the outer edge of the ends, to hold them from being forced outwardly, and by crimping, a groove, or a series of indentations just within the inner side of said end to keep it from being pressed inwardly, thus forming a perfect crozing for the end of said box to rest in. I prefer to make the inner side of the croze by forming a series of indentations, as above suggested, in lieu of a continuous corrugation extending around the box or case, because the metal forced into the inner edge by the series of indentations around it prevents it from being turned around by any force, and holds it much more securely than a simple shoulder formed by forcing in a bead. But my machine is also adapted to making boxes and cases of the other style—that is to say, those with one simple groove of large size, crimped in around the box or cover in place of the series of indentations. This forms a continuous corrugation or internal projection around the inner side of said box, to answer the double purpose, first, of holding in the head or end, and, second, forming a stop-bead to hold the cover in its proper place. The crimping referred to may be performed in such a manner by the aid of a toothed wheel and other suitable appliances, that the metal above or within the end is pressed inwardly, and a great number of points distributed around the case, leaving the metal between these points nearly in the same state as before. By using a continuous bead, properly arranged on a suitable wheel used in connection with the toothed wheel, I form a slight shoulder additional to the series of indentations, so that the series of indentations shall confine the end and the slight shoulder additional shall form a stop, and gage the position of the edge of the cover.

To enable others skilled in the art to make and use my machine, I will proceed to describe its construction and operation by the aid of the drawings and of the letters of reference marked thereon.

A is an iron or wooden bed piece, supported on suitable legs. Four upright pieces or frames, $A'$, $A^2$, $A^3$, and $A^4$, are fixed thereon. Two of these uprights, $A'$ and $A^2$, support a shaft or mandrel, B, which is adapted to be turned by the aid of a belt running upon the pulley C. This pulley is made with one or more deep notches, $C'$, (see Fig. 11,) in its outer face, and the mandrel B is provided with one or more corresponding projections, $b$, adapted to act therein. An arm, $a$, fixed on the upright $A'$, stands in a groove in the hub of the pulley C, and allows it (the pulley) to revolve without moving axially. The several parts described serve as a clutch, and operate together to allow the mandrel B to be moved endwise toward the left, so as to bring the pin $b$ into the notch $C'$, and thus to cause the mandrel B to receive a rapid rotary motion from the continuously revolving pulley C, and allow it to be moved endwise to the right, so as to disconnect it from the pulley C and allow it to stop at pleasure. On the opposite end of the mandrel B is a circular head, $B^2$, corresponding with the size of the box or case to be made, the head used for the cover being, of course, a little larger than that used for the body. This head is adapted to press fairly against the inner side of the circular end 3 of the box or case to be made, and to hold it firmly between itself and a loose center, or freely-revolving shaft D, which is mounted on the frame $A^3$.

E is a loose collar fitted on the mandrel B. The pin $b'$ presses against one face of this collar, and the stout fixed collar $B'$ presses against the opposite face thereof.

F and G are links pivoted together, and also pivoted as represented, the link F to the loose collar E, and the link G to the frame $A'$. There are corresponding links on the farther side of the machine, connected at their lower or inner ends to the yoke H and bar $h$. The lower end of the bar $h$ is pivoted to a lever, I, mounted on the shaft $i$. To the opposite end of the lever I is attached a rod, J, which connects it to the treadle K, mounted on the shaft $k$. Two coiled springs, L L, support the treadle ordinarily in a horizontal position, as indicated in Figs. 1, 2, and 3. When the treadle K and its connections are released, the mandrel B and its connections are moved endwise to the right by the collapsing of the links or toggle-lever F and G, in obedience to springs L L. In this condition the pulley C rotates idly. The material for a box composed of a formed ring, 1 2, joined as before intimated, with the end or head 3 placed inside, is now slipped on the head $B^2$ of the mandrel B. The treadle K being now depressed by the foot, the mandrel B moves to the left and seizes the material for the box by the bottom, or end 3, compressing the latter firmly between the head $B^2$ and the free wheel or center D, while by the action of the clutch above described, which causes the pulley C to act upon the mandrel B, in this condition of the parts it commences to rotate rapidly, carrying the box material with it. I provide a shoulder, $B^3$, on the head $B^2$. Against this the edge of the rim of the material for a box is pressed and trued during the operation, in a manner which will be apparent from the drawings on inspection.

After the shaping mechanism, which consists of two wheels peculiarly arranged and operated relatively to the parts now being described, has performed its function and transformed the material into a strongly-made box, as shown in Fig. 9, the mandrel B is allowed to move again to the right by the releasing of the treadle K and the consequent collapse of the toggle F G. In this open condition of the parts the box falls out, or is readily removed from the machine. New material must then be supplied, and the entire operation repeated.

I will now describe the means of forming or compressing the box while the material is thus rotated.

M and N are two wheels mounted on the cranks O and P, so as to stand on opposite sides of the head $B^2$. These forming-wheels M and N are fixed on the rocking or eccentric shafts $o$ and $p$. These shafts are provided with stout arms, $o'$ $p'$, which work side by side, arranged as represented.

Q and R are links connected respectively to the ends of the arms $o'$ $p'$. V is a triangular frame, which connects these links in a peculiar manner to the hand-lever below. This frame is composed of two plates, which apply on opposite sides of the lower ends of the links Q and R, as also in a similar manner to an arm, W′, on the hand-lever W. The bolts or rivets which connect this frame V with the lever W, and also with the several links, form joints or hinges on which the parts may freely turn to a limited extent. The hand-lever W has a fulcrum at $w$, which is fixed to the framework. When the handle W is elevated, it elevates the arms $o'$ and $p'$, and by rocking the shafts $o$ and $p$ moves the wheels M and N outwardly. When the hand-lever W is depressed, it operates in a reverse direction, causing M and N to approach each other, as will be obvious. As these wheels come in contact with the rapidly-rotating box material, they commence rotating by friction, thus forming the box. The wheels M and N are each provided with a flange, M′ and N′, adapted to bend the edge of the metal inward, and confine the end 3 of the box or case by pressing firmly around the edge of its lower or outer face. The wheel M is provided in addition with a series of teeth, $m$, arranged as represented, each performing a very important and novel function—to wit, that of indenting the metal of the box in a series of points or corrugations extending around the box immediately above the bottom 3, and serving to confine the bottom firmly and without straining the metal. The wheel N has no such teeth, but only a narrow bead, as indicated, for the purpose of forming an internal bead or continuous projection all around the inner side of the box, just above the corrugation, for the purpose of a stop to hold the cover in its proper place. It will, of course, be understood that in making boxes or cases in which a continuous bead is produced on the interior instead of a series of internal projections described, the two rollers M and N should be alike, and both should have a broad bead around them at the place occupied by the series of teeth $m$ to form the groove around the exterior of the box or case, which groove by pressing in the material continuously around forms the required projection on the inner side of the box; but this is an exceptional style of box. I much prefer the kind shown in the figures, and will describe the machine as adapted therefor. The head $B^2$ of the mandrel B is rabbeted, as represented by $B^4$, to a width and depth a little greater than the width and depth of the teeth $m$ on M. This rabbet allows the metal in that part of the box to be corrugated by the bending inward of the parts which are presented to each of the teeth in the wheel, while the adjacent metal just above or nearer the rim is firmly supported on the cylindrical surface of the head $B^2$ between the rabbet $B^4$ and the shoulder $B^3$. It will be observed that at this part—that is to say, between these two shoulders, the edge of the rabbet $B^4$ and the shoulder $B^3$—the diameter of the head $B^2$ is only a little less than that of the interior of the box, so that the rim will easily slip over it. The shoulder $B^4$ nearest the end of said head $B^2$ is just the distance from its end that I wish the projection or stop-bead above the corrugation to stand above the inner side of the wooden end or head 3. I prefer to make the diameter of the head at this rabbet just one-third of an inch smaller than the diameter of the part just above in order to allow the corrugation and stop-bead to be properly pressed therein; but this precise depth of the indentations may not be absolutely essential to the success of my invention. The wheels M and N are sufficiently wide to extend considerably beyond the indented portion of the box, and each presents a fair cylindrical surface to press on the cylindrical portion 1 of the box above the corrugation—that is to say, on that part which lies between the rabbet $B^4$ and the shoulder $B^3$. When the elevation of the treadle K, in obedience to the action of the springs L L, has moved the mandrel B to the right, the material for a box may be slipped on the head very easily. When by a depression of the treadle K and the movement of the mandrel B, the material of the box has been seized between the latter and the free center D, which, it should be remarked, is made adjustable by the set-screw, (marked Q′,) to adapt it to various thicknesses of stuff, so as to turn a wide or narrow fold, 4, over and around the end 3 of the box at will, the box is rotated rapidly. Next, by a depression of the hand-lever W, the wheels M and N are moved simultaneously inward, the bottom 3 is tightly secured, both against falling out and against being displaced inwardly, by the bending inward of the material, both below and above it, as above described. The amount of distortion to which the metal of the box or case may be subjected is necessarily limited, and I take care to so adjust my machine that so soon as the proper amount of compression and of beading and corrugating has been produced on the metal at the proper points, above and below the edge of the bottom, the wheels M and N, by resting against the cylindrical portion of the box material and pressing it fairly and unyieldingly against the cylindrical surface of the mandrel head between $B^3$ and $B^4$, will be firmly supported, and will prevent the strain on the material of the box from being carried any farther, however severely the hand-lever W may be depressed.

In Figs. 13, 14, and 15 numbers are employed to indicate the several different parts or features of the box or case. The Arabic figure 1 indicates the plain cylindrical portion. 2 indicates the joint, which is represented as lapped and soldered. 3 is the bottom or circular end. 4 is the bottom flange or internal bend of the side metal, which prevents the bottom or end 3 from being forced out. 5 is the outside bead opposite the bottom 3. 6 is the series of internal projections or corrugations produced by the teeth end, and which perform the function of pressing upon and somewhat indenting into the upper face of the bottom 3 around its edge. They hold the bottom 3 strongly and tightly down upon the flange 4, and also, by reason of their being indented or compressed into the material of the bottom 3, prevent its being turned around relative to the side or becoming in any manner loose. 7 is the shoulder, which is produced by the bead on the wheel N, and which serves as a stop for the cover.

In view of the action to which the materials of the box or case, with its double or soldered joint, is subjected between the two opposite wheels, M and N, and the head B, the peculiar nature of the connections Q, R, and V may be appreciated. The triangular frame V, by rocking slightly, allows the shafts $o$ $p$ to rock separately or simultaneously in either direction, and thus insures a uniform pressure on the two sides of the box under all circumstances. When, for example, a thick portion, 2, of the box passes between the head $B^2$ and the wheel M, the wheel M yields and moves outwardly to accommodate it; but the slight rocking of the shaft $o$ to allow this movement is not participated in by the shaft $p$. On the contrary, the triangular frame V rocks slightly and the hand-lever W rises a very little, and the hand of the operator yields to allow it, and the positions of the link R, arm $p'$, shaft $p$, and wheel N are not changed at all. The movements in the reverse direction are performed so soon as the bunch has passed through.

I have demonstrated by use that the mutual accommodation of this mechanism, each part to each, is so perfect that I can introduce the material in the form of a ring of tinned iron, lapped together at the juncture and soldered with a mass of solder as thick as may be desired in practice without sensibly disturbing the equality of the pressure on the opposite sides of the box, or introducing any difficulty beyond a slight imperfection in the corrugations at that point, which is an evil of no magnitude.

I believe this machine is the first with which it has been possible to operate on the opposite sides of a box simultaneously, so as to support the material and allow the material to be introduced, shaped, and removed, using rings, the joints in which were previously soldered. The support is so perfect and uniform that the process of swedging in the head or end after soldering will not stretch the tin material; but the diameter of the ring remains the same after it is formed into a box, so that there is no difficulty in fitting the covers.

It is well known that in shaping such boxes in any ordinary machine, such as are used by tinners, much difficulty arises from the distortion and change of diameter of the stuff.

I do not confine myself to the use of the clutch described, as I can use other mechanism for stopping the rotation of the mandrel B. Nor do I confine myself to my treadle K and toggle F G for giving an endwise motion to the mandrel B. I can dispense with the clutch altogether and allow the mandrel to rotate continuously, and I can give the desired end motion by the hand-lever or other device. One device which I have tried moves the mandrel endwise by an inclined plane or wedge. This form is represented in Fig. 12, which is a perspective view of my working-lever machine; but I prefer the device first represented. With it the operation of manufacturing is more rapid, but not appreciably more perfect. By giving a suitable form to the head $B^2$ and to the wheels M and N, and properly adapting them to each other, I can manufacture boxes and cases in a manner similar to the above, which shall have ends not strictly circular, like those herein shown, but which may be oval to any required extent, or may be square with rounded corners, or in any polygonal form with rounded corners; but I prefer the circular form for all ordinary purposes.

Having now fully described my invention, what I claim as new therein, and desire to secure by these Letters Patent, (marked B,) is as follows:

As a new method of manufacture, the forming of boxes or cases of the character substantially as herein described by first soldering the edges 2 of the sides 1, next introducing the bottom or end 3, and finally forming the croze by bending the metal at 4 and 6 at one operation against the outer and inner faces of the end 3, in the manner substantially as herein set forth.

HORACE THAYER.

Witnesses:
THOMAS D. STETSON,
HOWARD HENDRICKS.